(12) United States Patent
Chang

(10) Patent No.: US 6,804,256 B2
(45) Date of Patent: Oct. 12, 2004

(54) AUTOMATIC BANDWIDTH ADJUSTMENT IN A PASSIVE OPTICAL NETWORK

(75) Inventor: Tsung-Shien Chang, San-Wan Shin (TW)

(73) Assignee: Glory Telecommunications Co., Ltd., Taoyuan (TW)

( * ) Notice: Subject to any disclaimer, the term of this patent is extended or adjusted under 35 U.S.C. 154(b) by 589 days.

(21) Appl. No.: 09/912,017

(22) Filed: Jul. 24, 2001

(65) Prior Publication Data

US 2003/0020991 A1 Jan. 30, 2003

(51) Int. Cl.⁷ ............................ H04J 3/22; H04B 10/08; H04B 10/10
(52) U.S. Cl. ........................ 370/468; 370/412; 370/493; 398/25; 398/27; 398/71; 398/99; 398/168; 398/54
(58) Field of Search .............................. 398/25, 67, 69, 398/70–71, 168, 27, 51, 54, 59–60, 99; 370/468, 322, 409, 411–413, 417, 442; 709/230

(56) References Cited

U.S. PATENT DOCUMENTS 5,854,701 A * 12/1998 Clarke et al. ............... 398/100

| | | | |
|---|---|---|---|
| 2003/0007508 A1 * | 1/2003 | Sala et al. | 370/468 |
| 2003/0048805 A1 * | 3/2003 | Yoshihara et al. | 370/468 |
| 2003/0179769 A1 * | 9/2003 | Shi et al. | 370/442 |
| 2004/0052274 A1 * | 3/2004 | Wang et al. | 370/468 |
| 2004/0057461 A1 * | 3/2004 | Dawidowsky et al. | 370/468 |
| 2004/0057462 A1 * | 3/2004 | Lim et al. | 370/468 |

* cited by examiner

Primary Examiner—Kinfe-Michael Negash

(57) ABSTRACT

The invention provides an automatic bandwidth adjustment method and system in a passive optical network (PON) comprising an optical line terminal (OLT) connected to a plurality of optical network units (ONUs). A particular embodiment of the method according to the invention comprises the steps of transmitting data between at least one of the ONUs and the OLT, detecting if there is any undelivered data in the data being transmitted, queuing the undelivered data in an undelivered data block (UDB) in an upstream frame of the ONU, informing the OLT of the undelivered data using the undelivered data block (UDB), reading the UDB, adjusting bandwidth of the ONU according to the UDB, informing the ONU whether the PON is busy using an unused bandwidth block (UBW), and rejecting a new transmission request between the ONU and the OLT if the PON is busy or unavailable.

20 Claims, 14 Drawing Sheets

FIG. 8

| b7 | | | | | | | b0 | b7 | | | | | | | b0 | b7 | | | | | | | b0 | b7 | | | | | | | b0 | |
|---|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | User Port Identification 721 |
| 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | User Port Identification 723 |

FIG. 13

| Preamble (4 bytes) | SSD (4 bytes) | ONU ID | K2 | ABAB |
|---|---|---|---|---|
| | | R | R | ABAT |

1301, 1307, 1305, 1311, 1313, 1303, 1309, 1315

AUTOMATIC BANDWIDTH ADJUSTMENT IN A PASSIVE OPTICAL NETWORK

RELATED APPLICATIONS

The present application relates to U.S. patent application Ser. No. 09/792,309 filed on Feb. 23, 2001 and entitled "IP PACKETIZED FRAME FORMAT IN A PASSIVE OPTICAL NETWORK" which is incorporated herein by reference.

BACKGROUND OF THE INVENTION

1. Field of the Invention

The invention relates to optical networks and, more particularly, to the automatic bandwidth adjustment in a passive optical network (PON) with optical network units or ONUs.

2. Description of the Related Art

A passive optical network or PON is an optical network that does not employ, or reduces the use of, active devices such as lasers, regenerators and amplifiers. A PON includes an optical line terminal (OLT), located at the central office (CO) or cable headend, connected to a plurality of optical network units (ONUs). Because of the reduction in the number of active devices, the optical network can improve performance and become more cost-effective in operation and maintenance.

A PON can employ a tree, bus or ring architecture in connecting the single OLT with the ONUs. FIG. 1 is a block diagram generally illustrating a PON with an OLT 11 connected to a plurality of ONUs in a ring structure, including at least ONUs 111, 112, 113, 114 and 115. FIG. 2 is a block diagram generally illustrating a PON with an OLT 21 connected to a plurality of ONUs in a tree architecture, including at least ONUs 211, 212, 213, 214 and 215. FIG. 3 is a block diagram generally illustrating a PON with an OLT 31 connected to a plurality of ONUs in a bus architecture, including at least ONUs 311, 312, 313, 314, 315 and 316. Data travels upstream when the data are transmitted from the ONUs to the OLT. Data travels downstream when the data are transmitted from the OLT to the ONUs. The OLT can also be connected to another optical or non-optical network, e.g., the Internet or an Internet protocol (IP) network. Note that IP is a widely used protocol in the art that specifies the format of packets (also called datagrams in IP network) and the associated addressing scheme. A packet is a piece of a message transmitted over a packet-switching network (such as an IP network) where the packet includes the destination address in addition to the data, and each packet in the network is transmitted individually (which can follow different routes) to its corresponding destination.

As data traffic increases or decreases due to the size and type of data being transmitted in the PON, bandwidth utilization and efficiency may suffer. There is therefore a general need in the art for a PON that allows automatic bandwidth adjustment in optimizing bandwidth usage and thereby improving bandwidth efficiency.

SUMMARY OF THE INVENTION

The invention provides an automatic bandwidth adjustment method and system in a passive optical network (PON) comprising an optical line terminal (OLT) connected to a plurality of optical network units (ONUs). A particular embodiment of the method according to the invention comprises the steps of transmitting data between at least one of the ONUs and the OLT, detecting if there is any undelivered data in the data being transmitted, queuing the undelivered data in an undelivered data block (UDB) in an upstream frame of the ONU, informing the OLT of the undelivered data using the undelivered data block (UDB), reading the UDB, adjusting bandwidth of the ONU according to the UDB, informing the ONU whether the PON is busy/unavailable using an unused bandwidth block (UBW), and rejecting a new service transmission request (such as a video on demand (VOD) request) between the ONU and the OLT if the PON is busy or unavailable.

A further embodiment of the method according to the invention comprises the steps of calculating the unused bandwidth (UBW) and informing the ONUs of the UBW, sending an Downstream frame to the ONUs, and determining if an ONU frame (for each of the ONUs) is received at the OLT. If it is determined that an ONU frame is received at the OLT, the UDB is recorded at the OLT, recalculating an automatic bandwidth adjustment beginning (ABAB) and an automatic bandwidth adjustment terminating (ABAT), and calculating a new UBW for each received ONU frame. If an ONU frame is not received at the OLT, a new UBW is calculated for each ONU frame not received at the OLT. The Downstream frame with the recalculated ABAB and ABAT is sent to each of the ONUs.

At the ONUs, the UDB is calculated, and the ONU frames are transmitted to the OLT. At each of the ONUs, it is then determined whether an downstream frame is received. If the Downstream frame is received, each of the ONUs records the recalculated ABAB and ABAT from the received Downstream frame, updates the ABAB and ABAT, checks the UBW for deciding to accept (or not) a new transmission, and calculates a new UDB for each of the transmitted ONU frames. If it is determined that the downstream frame is not received, a new UDB is calculated for each of the transmitted ONU frames. The ONU frames are then transmitted to the OLT with the updated ABAB and ABAT.

With the automatic bandwidth adjustment method and system according to the invention, a PON, through its OLT, can advantageously control the bandwidth for each of the ONUs in the PON and accordingly optimize the overall bandwidth utilization therein.

BRIEF DESCRIPTION OF THE DRAWINGS

The foregoing and other advantages and features of the invention will become more apparent from the detailed description of the preferred embodiments of the invention given below with reference to the accompanying drawings, not necessarily drawn to scale, in which:

FIG. 8 is a diagram illustrating the relationship between the bit position and the port number in the user port identification fields of an exemplary voice TDMA channel for an upstream data frame in a PON with automatic bandwidth adjustment according to the invention;

FIG. 13 is a diagram illustrating an optical network unit (ONU) header for a downstream data frame in a PON automatic bandwidth adjustment according to the invention.

DETAILED DESCRIPTION OF THE PREFERRED EMBODIMENTS

Figure 1:
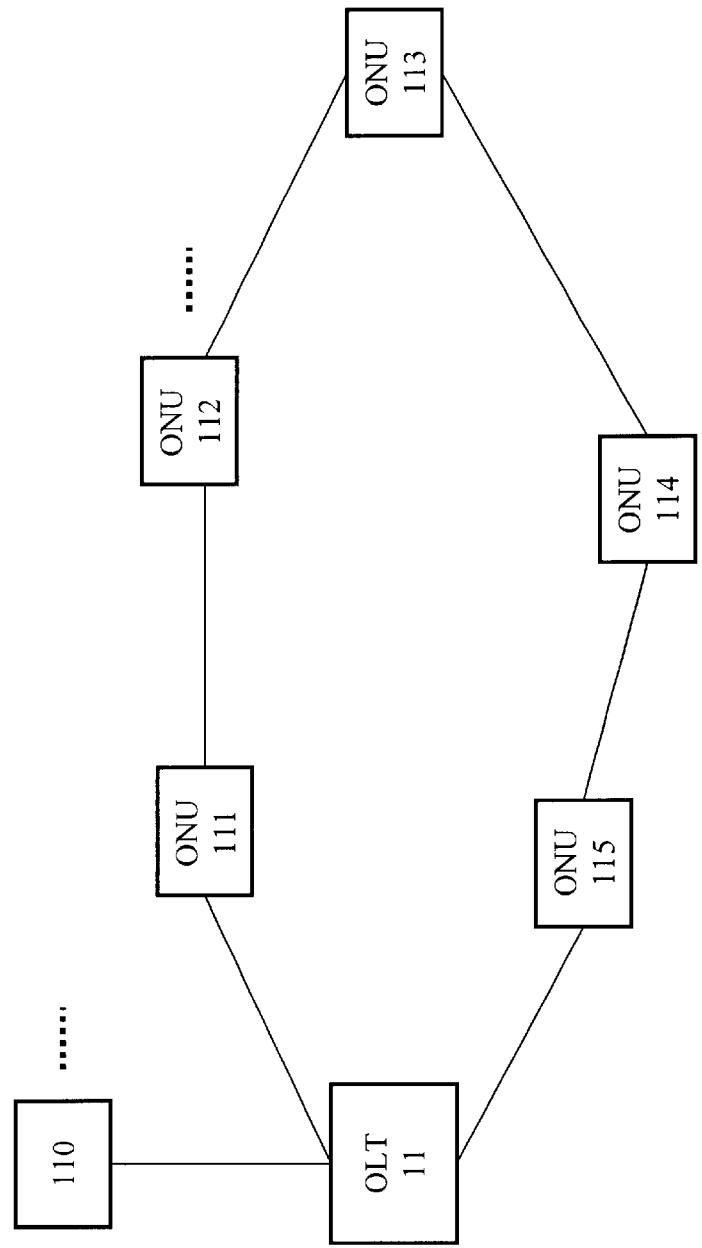
FIG. 1 is a diagram generally illustrating a passive optical network (PON) in the art with a ring architecture.
Figure 2:
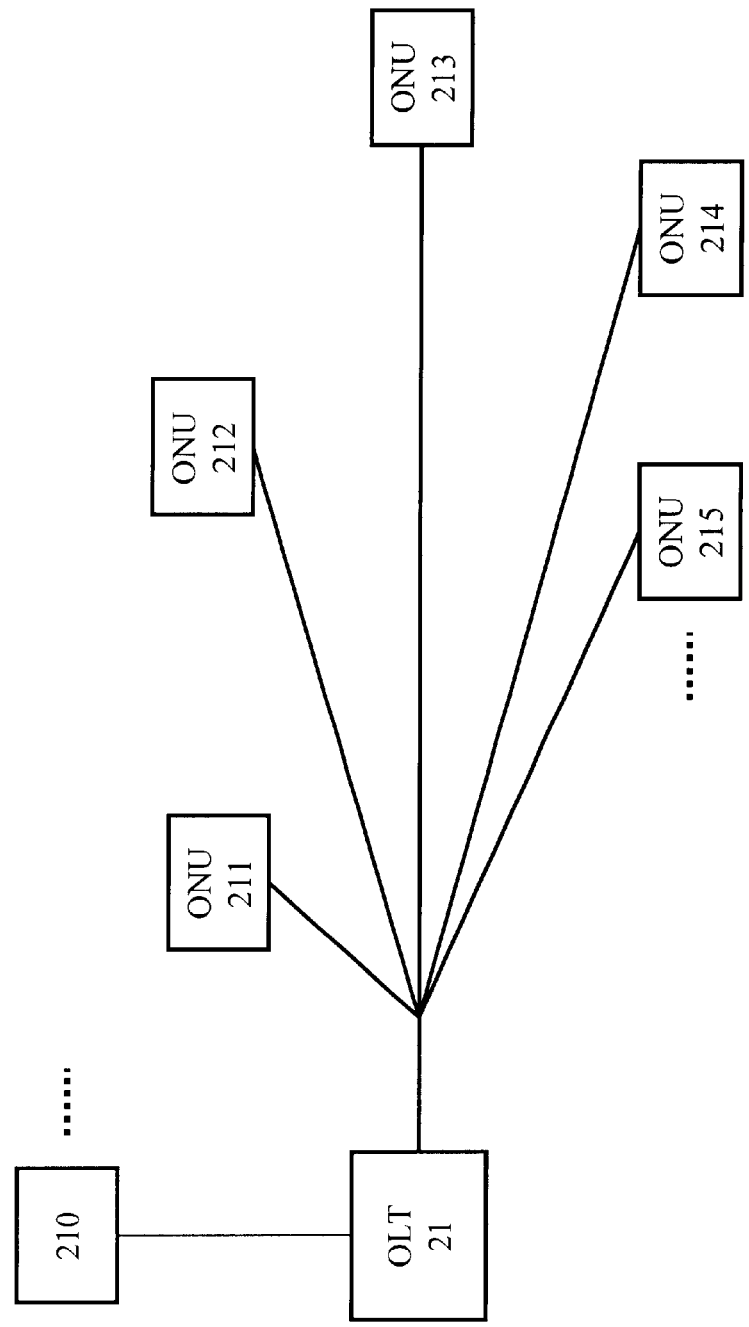
FIG. 2 is a diagram generally illustrating a passive optical network (PON) in the art with a tree architecture.
Figure 3:
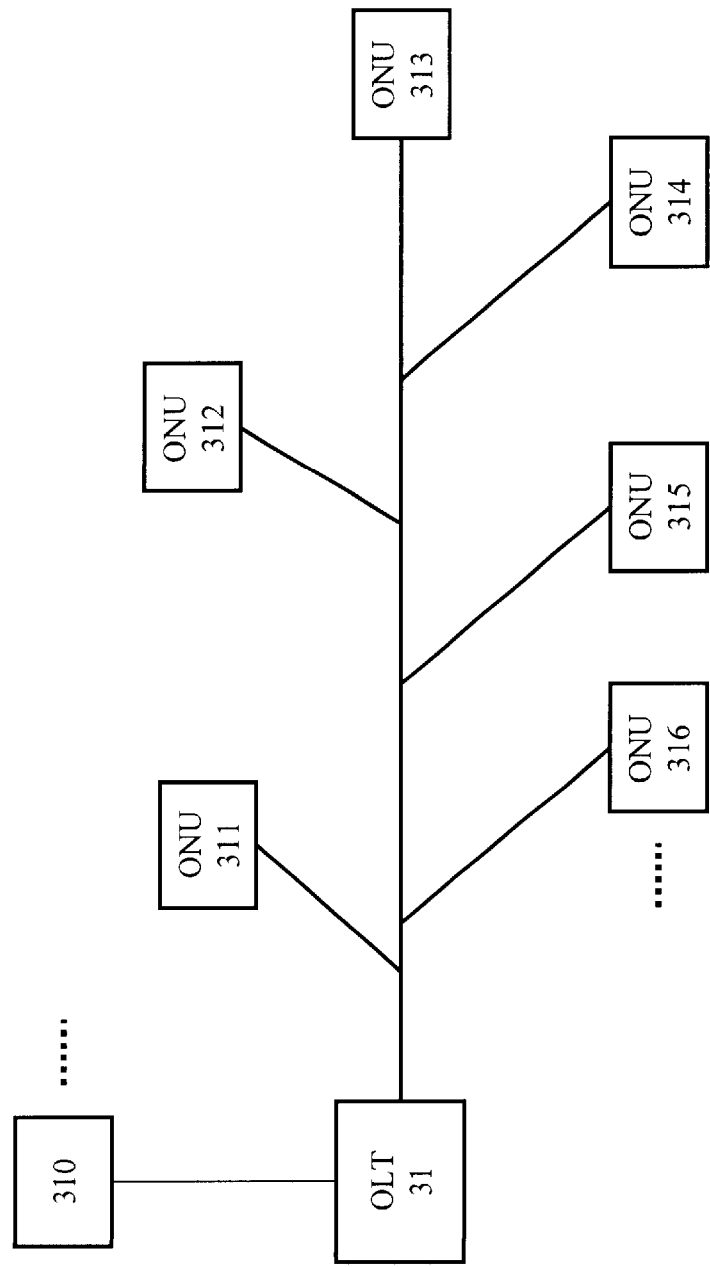
FIG. 3 is a diagram generally illustrating a passive optical network (PON) in the art with a bus architecture.
Figure 4:
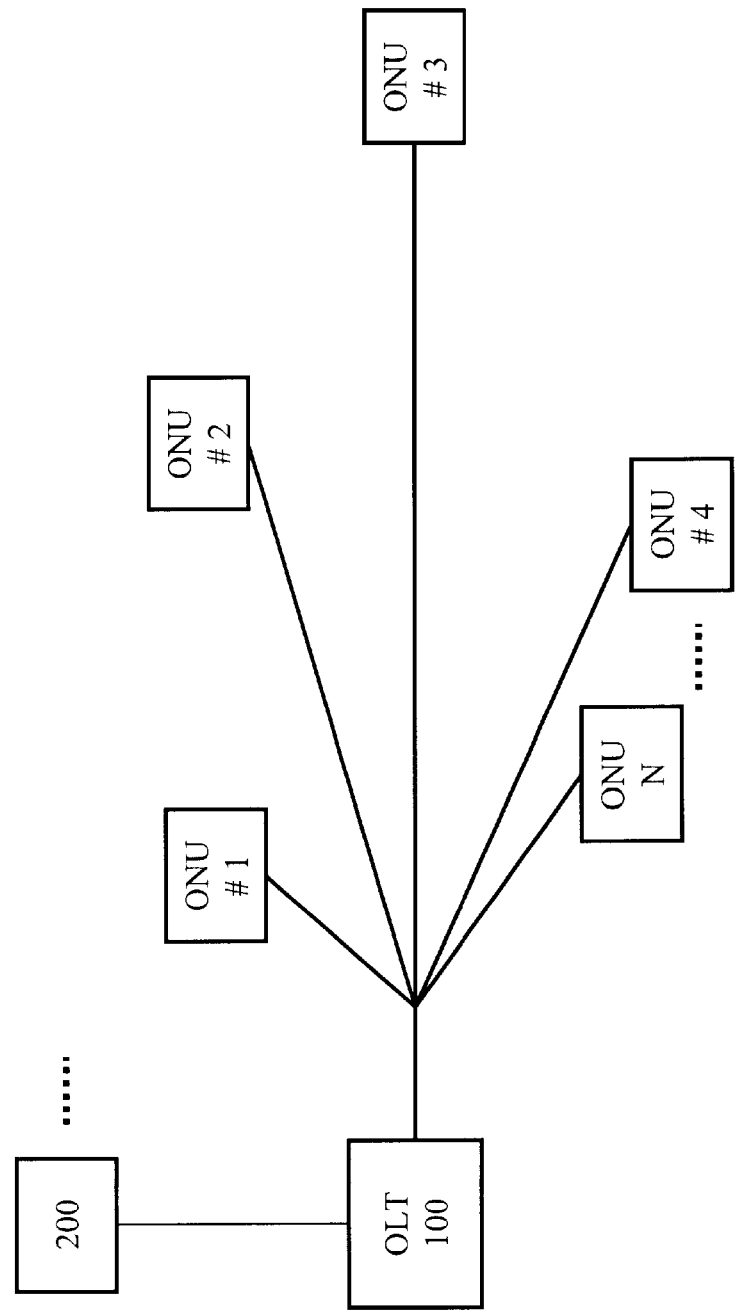
FIG. 4 is a diagram generally illustrating a PON using a data frame with automatic bandwidth adjustment according to the invention.

FIG. 4 is a block diagram that generally illustrates a passive optical network (PON) with an optical line terminal (OLT) 100 connected to an Internet protocol (IP) network 200. The optical line terminal (OLT) 100 is connected to a plurality of optical network units (ONU 1, 2, 3, 4, . . . and N, N being an integer) in a ring, bus or tree architecture. FIG. 4 particularly shows the PON in a tree architecture. The method and system according to the invention are not limited to a PON with a tree architecture, and can nonetheless be used in a PON with any type of architecture in general, including the ring- and bus-type architectures. The invention is herein described in conjunction with the PON shown in FIG. 4. Note that the invention can also be used in conjunction with the PON described in the related U.S. patent application Ser. No. 09/792,309 filed on Feb. 23, 2001 and entitled "IP PACKETIZED FRAME FORMAT IN A PASSIVE OPTICAL NETWORK" which is incorporated herein by reference.

Figure 5:
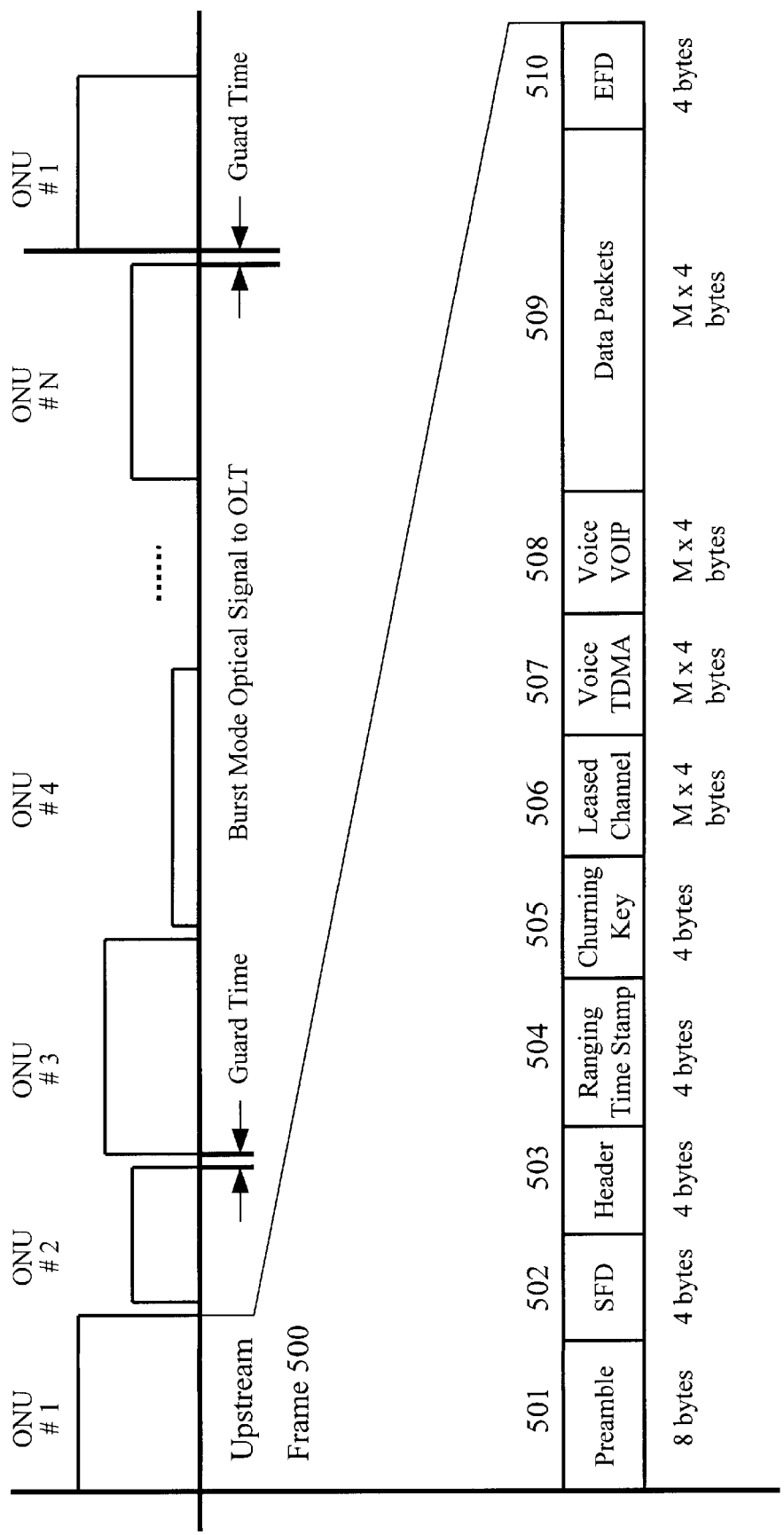
FIG. 5 is a diagram illustrating an exemplary upstream data frame in a PON with automatic bandwidth adjustment according to the invention.

FIG. 5 is a diagram illustrating an upstream frame 500 for carrying data or information upstream from the ONU 1 to the OLT 100 in accordance with the invention. The upstream frame format for the other ONUs (ONU 2, 3, 4, . . . and N) is generally the same as the upstream frame 500 for ONU 1. According to an exemplary embodiment of the invention, the upstream frames, each frame carrying data for each of the ONUs, travel in succession and separated by a guard time between two frames. In the present embodiment, the upstream frames travel to the OLT 100 in a burst mode, a data transmission mode in which the data are sent faster than normal.

The upstream frame 500 comprises ten fields, including an upstream preamble 501, an upstream start frame delimiter (SFD) 502, an upstream header 503, an upstream ranging time stamp 504, a churning key 505, a leased channel 506, a voice time division multiple access (TDMA) channel 507, a voice over Internet protocol (VOIP) channel 508, an upstream data packet channel 509, and an upstream end frame delimiter (EFD) 510.

In the automatic bandwidth adjustment according to the invention, the safety guard time is calculated on a double-word (DW), or 32-bit, basis, i.e., the safety guard time between two consecutive ONUs is calculated in the number of DWs.

In accordance with the invention, the preamble 501 contains 8 bytes (64 bits) of alternating 1s and 0s (AA, AA, AA, AA, AA, AA, AA, AA in hexadecimal) that alert the ONUs to the coming upstream frame 500 and enables the synchronization of its timing. The SFD 502, at 4 bytes, is used as a frame alignment signal to indicate the start of the upstream frame 500.

The header 503 is used for the system control of the PON that identifies the ONU 1 from which the data are being transmitted and specifies the undelivered data block (UDB) and, consequently, the unused bandwidth available for the PON. The header 503 contains three fields, including an ONU identifier, at 1 byte, that indicates the ONU number on the PON, another byte K1 used for the protection switch function for the PON, and an undelivered data block (UDB), at 2 bytes, for the automatic bandwidth adjustment in the PON.

The ranging time stamp 504 (4 bytes) is used to return the ranging time clock sent from the OLT 100. The ONU 1, for example, copies the ranging time clock received from the OLT 100 and stores it into the OLT ranging time stamp 504 for the ONU 1. In accordance with the invention, the OLT 100 calculates the timing difference (i.e., the round trip time) between the receiving time, the ranging time stamp received from the ONU 1, and the time of the ranging time stamp for adjusting the safety guard time between two ONUs, e.g., the ONUs 1 and 2. The ranging time stamp 504 can also be used for automatic bandwidth adjustment.

According to an exemplary embodiment of the automatic bandwidth adjustment according to the invention, as data are transmitted between at least one of the ONUs and the OLT 100, the PON determines if there is any undelivered data in the data block being transmitted, and queues the undelivered data in the undelivered data block (UDB) in an upstream frame 500 of the ONU. The OLT 100 is informed of the undelivered data using the UDB. As the UDB is read in the PON, the bandwidth of the ONU is adjusted according to the UDB. The ONU is informed whether the PON is busy/unavailable using an unused bandwidth block (UBW). A new transmission service request (such as a video on demand (VOD) request) between the ONU and the OLT 100 is rejected if the PON is busy or unavailable. VOD is an interactive multimedia system that functions like cable television, the difference being that an end user or customer can select a movie from a large video database. Individual customers in an area are able to watch different programs when they wish to, making the system a realization of the video rental shop brought into the home.

The churning key 505 (4 bytes) is used for performing the churning function of the PON. Churning refers to the encryption of transmission channels in the art. The leased channel 506 is an M×4-byte field (M being an integer), which is used to transport data, such as time division multiplexing (TDM) or IP data to the OLT 100 or the IP network 200. A leased channel or leased line is a generally permanent and constantly active connection between two points set up by a telecommunications common carrier, e.g., a T-1, T-3, DS1, E1, DS3 or E3 channel for accessing the Internet. A T-1 channel (sometimes referred to as a DS1 channel) is a dedicated telephone connection supporting transmission data rates of generally 1.544 megabits per second (Mbps). A T-3 channel (sometimes referred to as a DS3 channel) is a dedicated telephone connection supporting transmission data rates of generally 44.736 Mbps. An E-1 channel is a dedicated telephone connection supporting transmission data rates of generally 2.048 Mbps. An E-3 channel is a dedicated telephone connection supporting transmission data rates of generally 34.368 Mbps.

The voice TDMA channel 507, an M×4-byte field where M is an integer, is used to transport local call voice data packets to the OLT 100. Time division multiple access or TDMA is a technology for delivering digital wireless service using time division multiplexing or TDM. TDMA works by dividing a radio frequency into time slots and allocating the slots to multiple calls (such as local calls), thereby allowing a single frequency to support multiple, and generally simultaneous data channels.

The voice VOIP channel 508, an M×4-byte field, is used to transport long distance call data packets to the Public Switched Telephone Network (PSTN) or the IP network 200. PSTN refers to the international telephone system based on copper wires carrying analog voice data. Voice over Internet protocol or VOIP is a type of Internet telephony (i.e., an Internet telephony application over the Internet protocol), which is a category of hardware and software that enable end users to use the Internet as the transmission medium for telephone calls.

The upstream data packet channel 509, an M×4-byte field where M is an integer, is used to transport the data packets with lower priority (such as computer data files or image pictures) over the IP network 200. The end frame delimiter (EFD) 510, a 4-byte field (9E, 9E, 9E and 9E in hexadecimal) is used as a frame termination signal to indicate the end of the upstream frame 500.

The leased channel 506, voice TDMA channel 507, voice VOIP channel 508 and the upstream data packet channel 509 are described in further detail below in conjunction with FIGS. 6–11.

Figure 6:
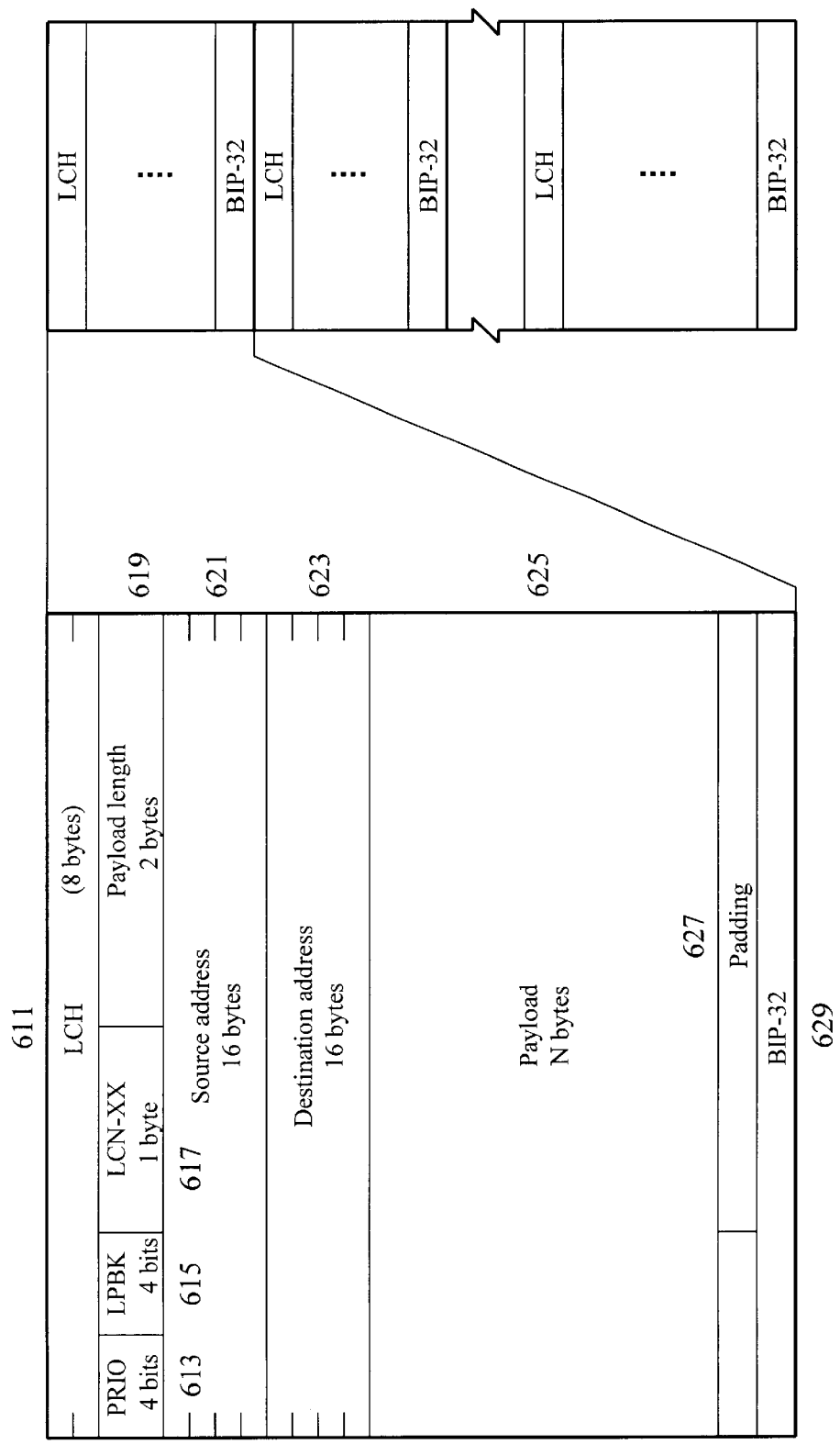
FIG. 6 is a diagram illustrating an exemplary leased channel for an upstream data frame in a PON with automatic bandwidth adjustment according to the invention.

FIG. 6 is a diagram illustrating an exemplary leased channel 506 for the upstream frame 500 in a PON with automatic bandwidth adjustment according to the invention. The leased channel 506 is an M×4-byte field (M being an integer), which is used to transport data, such as time division multiplexing (TDM) or IP data to the OLT 100 or the IP network 200. The leased channel 506 comprises a plurality of fields including the leased channel header (LCH) 611, the priority (PRIO) 613, the loopback (LPBK) 615, the LCN 617, the payload length 619, the source address 621, the destination address 623, the payload 625, the padding 627 and the bit interleaved parity 32 (BIP-32) 629.

The LCH 611, an 8-byte field, indicates the start of the leased channel 506. The PRIO 613, a 4-bit field, defines the priority level and the payload type of the data packets with respect to data traffic flow. A value of 0 for the PRIO 613 indicates the lowest priority. A value of 15 (or F in hexadecimal) indicates the highest priority. For instance, the priority value for the leased channel 506 is 14, for the voice TDMA channel 507 is 13, for the voice VOIP channel 508 is 12, for image data is 11. Data files can be at a lower priority level.

The LPBK 615, a 4-bit field, defines the loopback function of the leased channel 506. The LCN 617, a 1-byte field, is a reserved channel. The payload length 619, a 2-byte field, defines the total payload length of the leased channel 506. The payload length 619 does not include padding 627 and the bit interleaved parity 32 (BIP-32) 629.

The source address 621, a 16-byte IP address, identifies the original source of the data being transmitted. The destination address 623, also a 16-byte IP address, identifies the final destination of the data being transmitted, e.g., the IP network 200. If source routing is used, the destination address 623 includes the IP address of the next entity to which the data are being transmitted, e.g., the OLT 100, the ONUs, the IP network, other OLT and ONUs of another PON.

The payload 625, an N-byte field (N being an integer), includes the payload of the TDM data packets. If the TDM payload comes from an asynchronous network (such as an asynchronous transfer mode or ATM network), the total payload length could be (N×4)+y bytes (y=0, 1, 2, 3) so that the padding data are needed to make the data packets at N×4 bytes. Padding is used for filling in unused space, where the padding 627 is used to meet the requirement at N×4 bytes for the field of the payload length 625. ATM is a network technology based on transferring data in cells or packets of a fixed size, where ATM creates a fixed channel or route between two points whenever data transfer begins.

The bit interleaved parity 32 (BIP-32) 629, a 4-byte field, is used for monitoring the bit error ratio (BER) on the transmission link for transporting the data. Parity checking is the use of parity bits to check that the data have been transmitted accurately. The parity bit (e.g., BIP-32) is added to every data unit being transmitted. Each of the bits of the BIP-32 is the result of an exclusive-or (XOR) operation of all the same position bits in all the payload fields which include the padding bytes in the padding 627 prior to scrambling.

Figure 7:
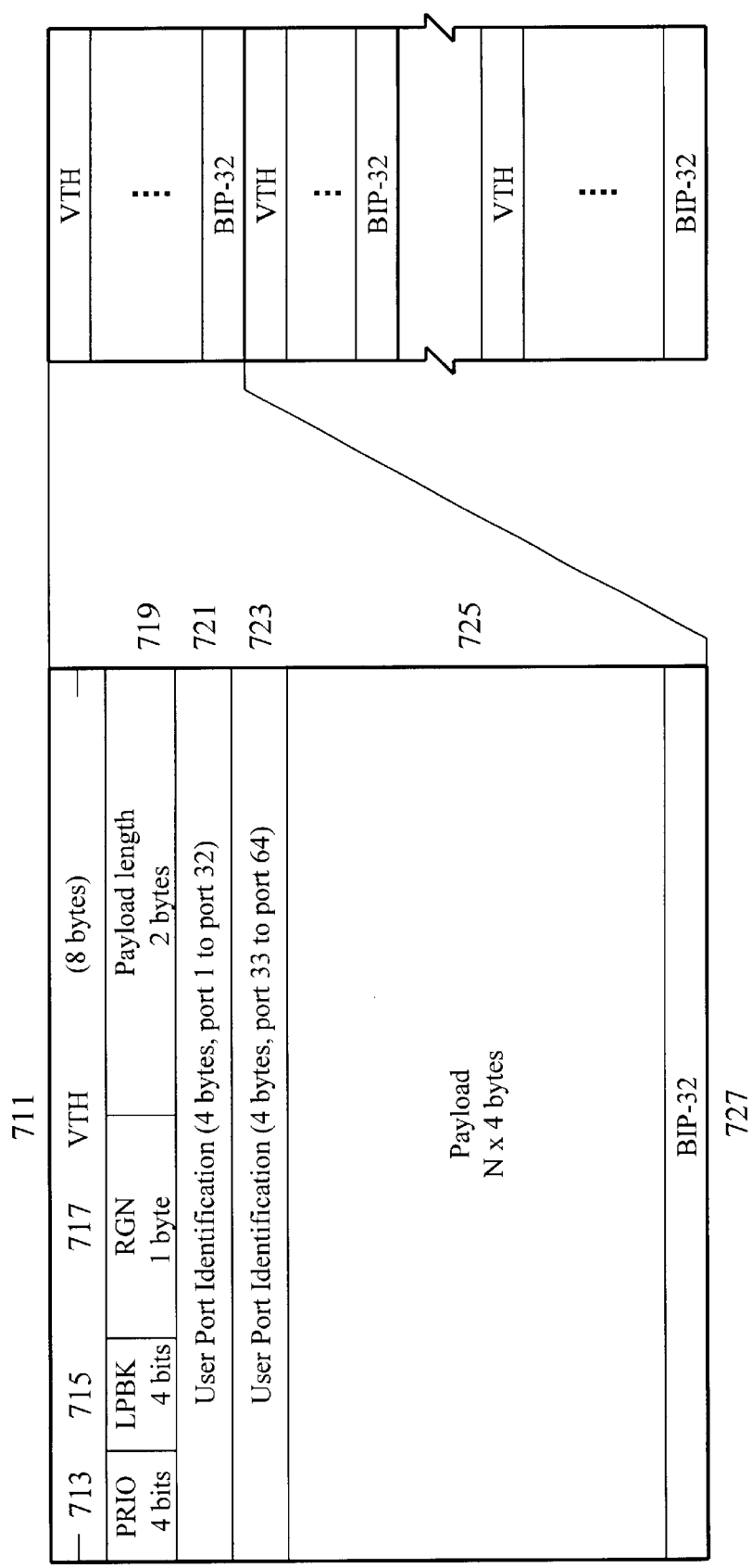
FIG. 7 is a diagram illustrating an exemplary voice TDMA channel for an upstream data frame in a PON with automatic bandwidth adjustment according to the invention.

FIG. 7 is a diagram illustrating an exemplary voice TDMA channel 507 for an upstream data frame in a PON with automatic bandwidth adjustment according to the invention. The voice TDMA channel 507, an M×4-byte field where M is an integer, is used for transporting the local call voice data packets to the OLT 100. The voice TDMA channel 507 comprises a plurality of fields including the voice TDMA header (VTH) 711, the priority (PRIO) 713, the loopback (LPBK) 715, the residential gateway number (RGN) 717, the payload length 719, the user port identifications 721 and 723, the payload 725 and the bit interleaved parity 32 (BIP-32) 727.

The VTH 711, an 8-byte field, indicates the start of the voice TDMA channel 507. The PRIO, a 4-bit field, defines the priority level of the data packets with respect to data traffic flow. The LPBK 715, a 4-bit field, defines the loopback function for the data packets of the voice TDMA channel 507.

The RGN 717, a 1-byte field, identifies the residential gateway connected to a particular ONU. A gateway is a combination of hardware and software that links two different types of networks, i.e., the PON and the particular ONU at the residence of an end user. The payload length 719, a 2-byte field, defines the total payload length for the data packets of the voice TDMA channel 507. The payload length 719 includes payload only, not the bytes of the BIP-32.

The user port identifications 721 and 723, having a total of 4 bytes, identify the corresponding user port of one voice group of the Media Gateway Control Protocol (MGCP). MGCP is a protocol that controls gateways of the VOIP on external call control elements. MGCP assumes a call control architecture where the call control intelligence is outside the gateways and handled by external call control elements. A port identifies an end user or subscriber's voice channel that corresponds to a telephone number of that end user or subscriber. FIG. 8 is a diagram that illustrates the relationship between the bit position and the port number in the user port identifications 721 and 723 where the first received bit (b7) of the first received byte is port number 1.

The payload 725, a field of N×4-bytes where N is an integer, contains the voice data packets of the voice TDMA channel 507. The voice data packets are sequentially arranged in the field of the payload 725 from user port 1 to port 64 according to the logical level of the corresponding bit positions for the user ports. If the logical level of the bit position is 1, then the voice data packets are put in the field of the payload 725. If the logical level of the bit position is 0, then there is no voice data packet present in the field of the payload 725. The BIP-32, a 4-byte field, is used for monitoring the bit error ratio (BER) on the transmission link for transporting the data.

Figure 9:
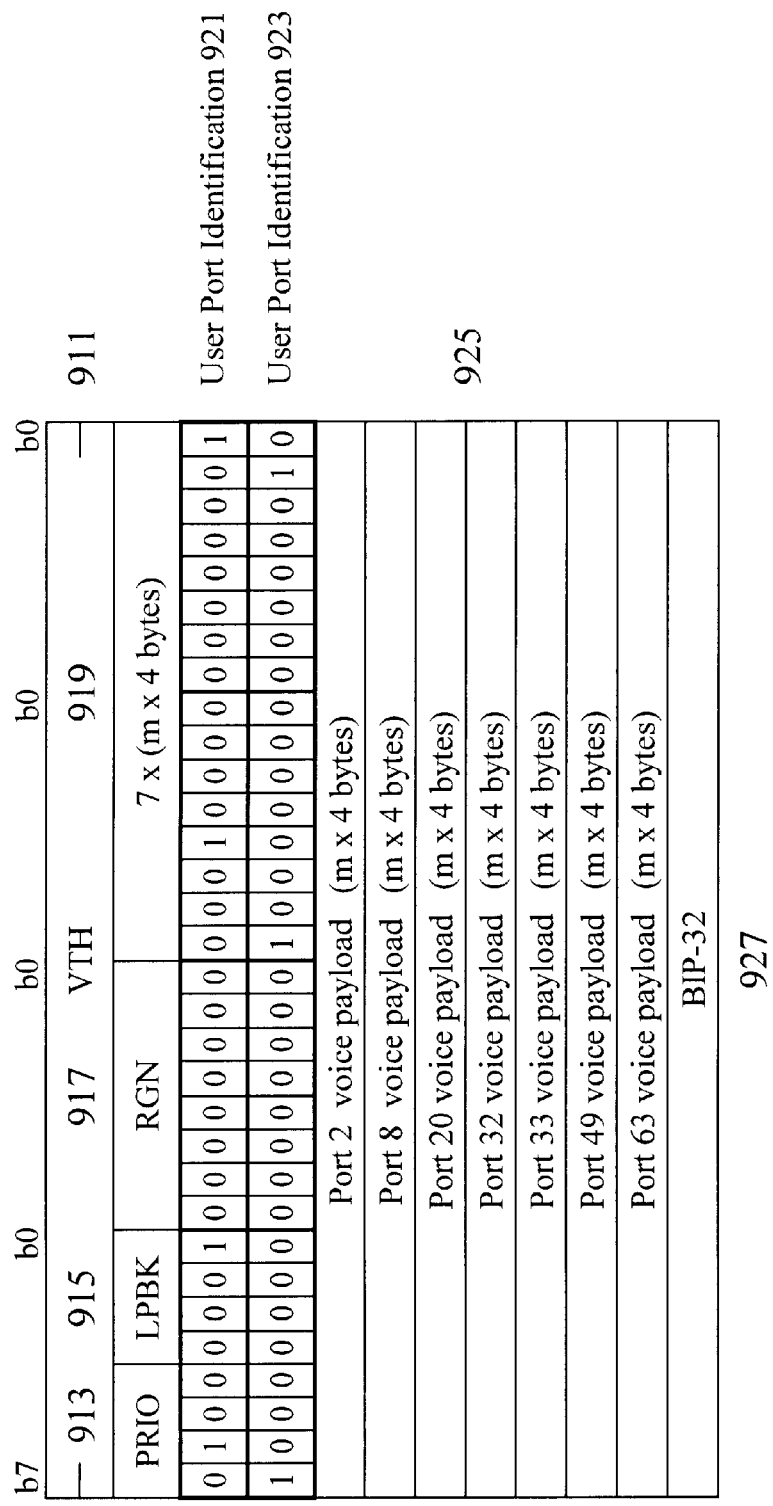
FIG. 9 is a diagram illustrating an exemplary data structure of an exemplary voice TDMA channel for an upstream data frame in a PON with automatic bandwidth adjustment according to the invention.

FIG. 9 is a diagram illustrating an exemplary data structure of the voice TDMA channel 507. The exemplary data structure for the voice TDMA channel 507 comprises a plurality of fields including the voice TDMA header (VTH) 911, the priority (PRIO) 913, the loopback (LPBK) 915, the residential gateway number (RGN) 917, the payload length 919, the user port identifications 921 and 923, the payload 925 and the bit interleaved parity 32 (BIP-32) 927. The fields 921 and 923 identify the corresponding user port of one voice group of 64 end users where each bit refers to a single end user. The field of the payload 925 includes the voice payload for user ports 2, 8, 20, 32, 33, 49 and 63.

Figure 10:
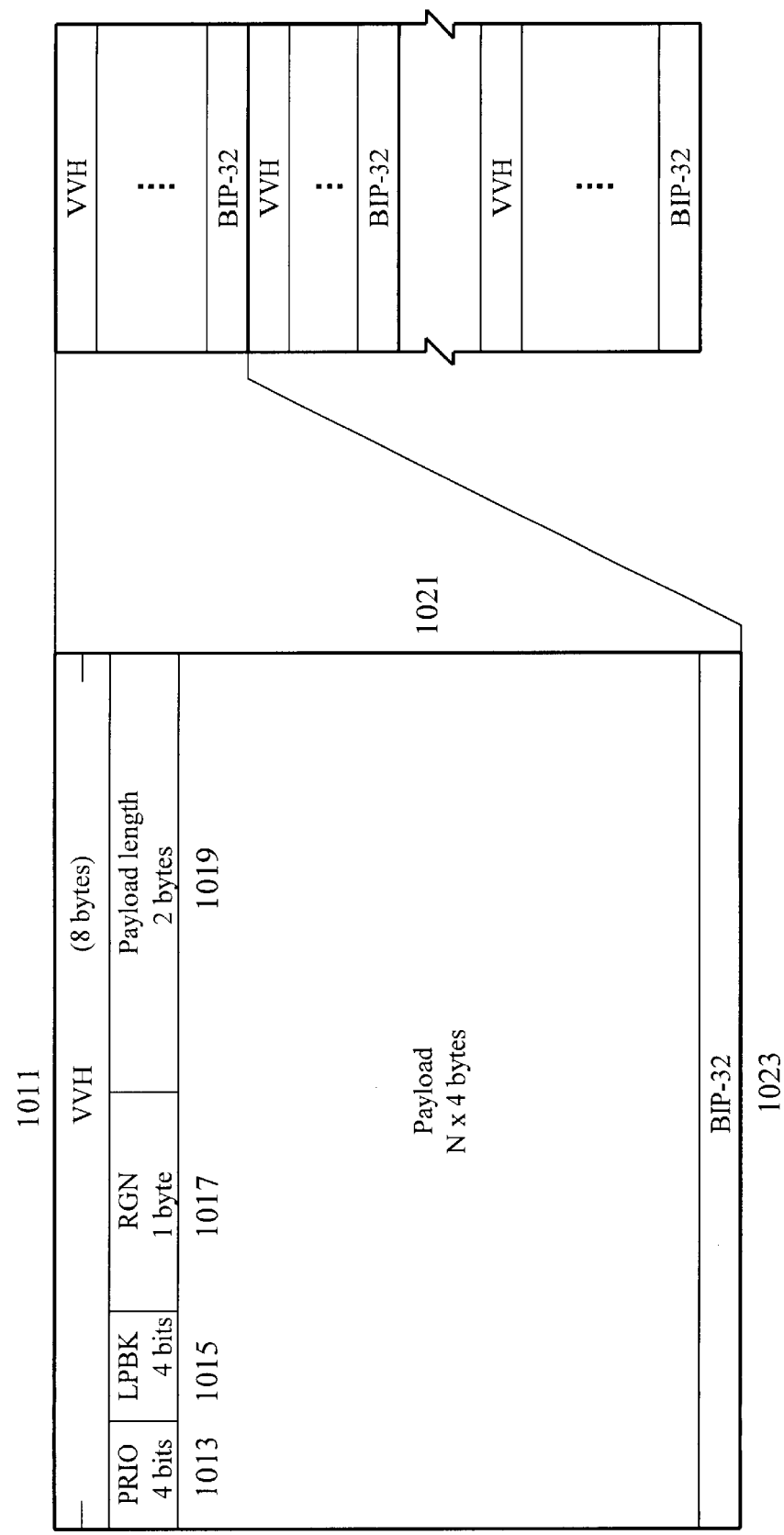
FIG. 10 is a diagram illustrating an exemplary voice VOIP channel for an upstream data frame in a PON with automatic bandwidth adjustment according to the invention.

FIG. 10 is a diagram illustrating an exemplary voice VOIP channel 508 in accordance with the invention. The voice VOIP channel 508, an M×4-byte field where M is an integer, is used to transport long distance call data packets to the PSTN or the IP network 200. The voice VOIP channel 508 comprises a plurality of fields including the voice VOIP header (VVH) 1011, the priority (PRIO) 1013, the loopback (LPBK) 1015, the residential gateway number (RGN) 1017, the payload length 1019, the payload 1021 and the bit interleaved parity (BIP-32) 1023.

The VVH 1011, an 8-byte field, indicates the start of the voice VOIP channel 508. The PRIO 1013, a 4-bit field, defines the priority level of the data packets with respect to data traffic flow. A value of 0 represents the lowest priority whereas a value of 15 (or F in hexadecimal) represents the highest priority. The LPBK 1015, a 4-bit field, defines the loopback function for the data packets of the voice VOIP channel 508. The RGN 1017, a 1-byte field, identifies the residential gateway connected to a particular ONU. The payload length 1019, a 2-byte field, defines the total payload length for the IP packetized voice packets of the voice VOIP channel 508. The payload length 1019 includes payload only, not the bytes of the BIP-32. The payload 1021, a field of N×4 bytes where N is an integer, contains the IP packetized voice packets of the voice VOIP channel 508. The BIP-32, a 4-byte field, is used for monitoring the bit error ratio (BER) on the transmission link for transporting the data.

Figure 11:
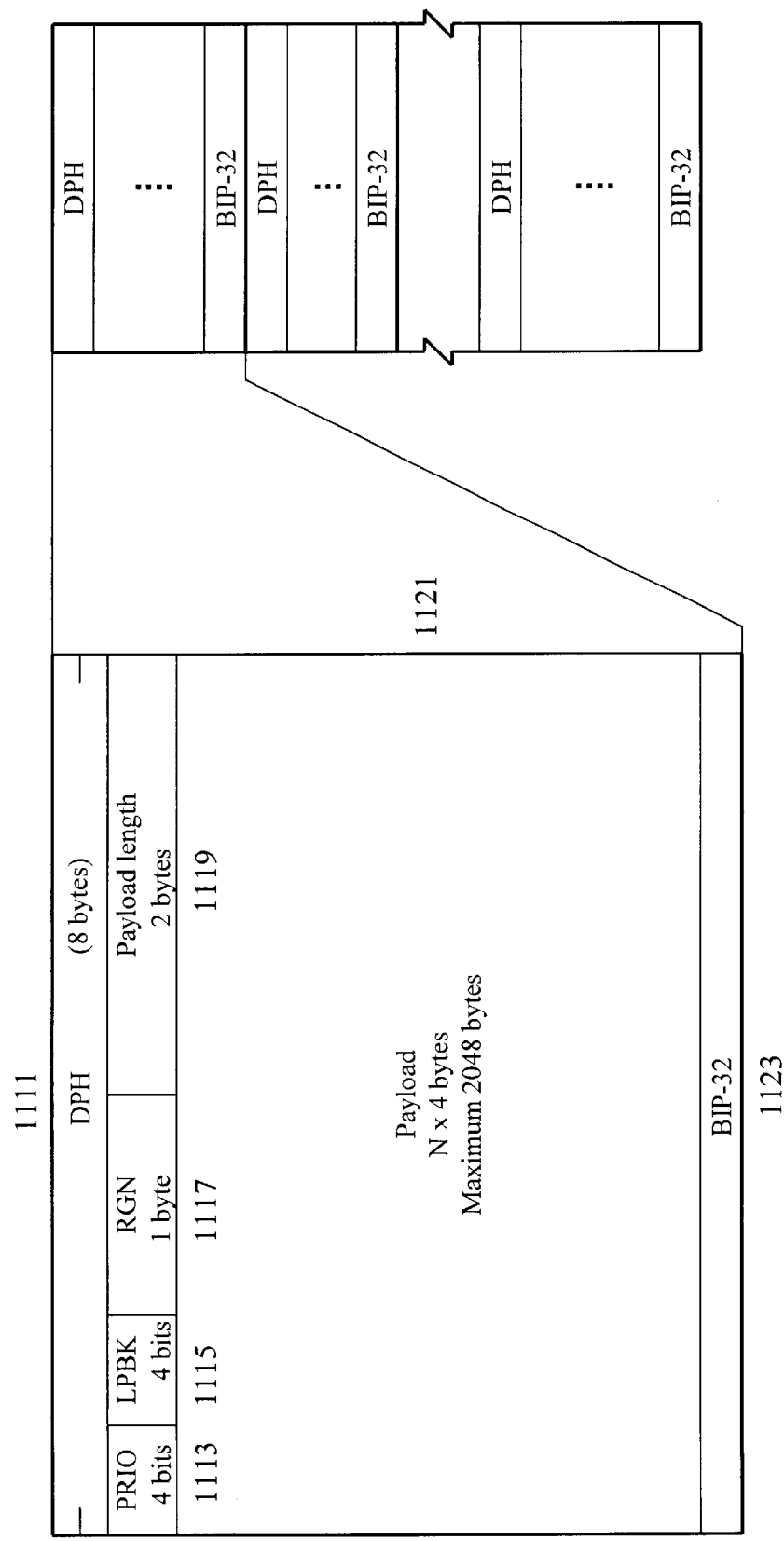
FIG. 11 is a diagram illustrating an exemplary upstream data packet channel for an upstream data frame in a PON with automatic bandwidth adjustment according to the invention.

FIG. 11 is a diagram illustrating an exemplary upstream data packet channel 509 according to the invention. The upstream data packet channel 509, an M×4-byte field where M is an integer, is used to transmit the data packets with lower priority (such as computer data files or image pictures) to the OLT 100 or the IP network 200. The upstream data packet channel 509 comprises a plurality of fields including the data packet header (DPH) 1111, the priority (PRIO) 1113, the loopback (LPBK) 1115, the residential gateway number (RGN) 1117, the payload length 1119, the payload 1121 and the bit interleaved parity 32 (BIP-32) 1123.

The DPH 1111, an 8-byte field, indicates the start of the upstream data packet channel 509. The PRIO 1113, a 4-bit field, defines the priority level of the data packets with respect to data traffic flow. A value of 0 represents the lowest priority whereas a value of 15 (or F in hexadecimal) represents the highest priority. The LPBK 1115, a 4-bit field, defines the loopback function for the data packets of the upstream data packet channel 509. The RGN 1117, a 1-byte field, identifies the residential gateway connected to a particular ONU. The payload length 1119, a 2-byte field, defines the total payload length for the data packets of the upstream data packet channel 509. The payload length 1119 includes payload only, not the bytes of the BIP-32. The payload 1121, a field of N×4 bytes where N is an integer, contains the data packets of the upstream data packet channel 509. The maximum payload length for each data packet in this embodiment is 2048 bytes. The BIP-32, a 4-byte field, is used for monitoring the BER on the transmission link for transporting the data.

Figure 12:
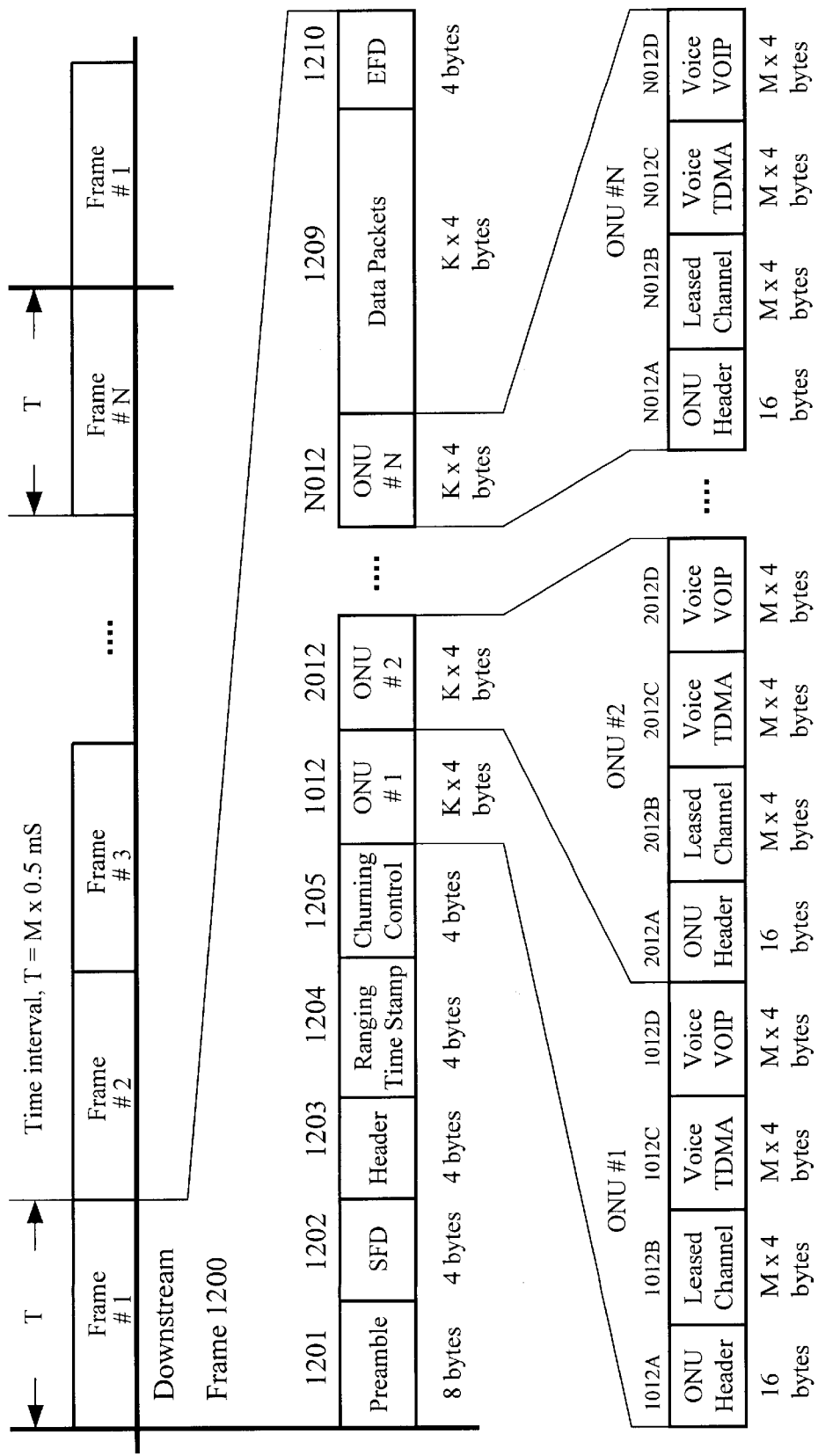
FIG. 12 is a diagram illustrating an exemplary downstream data frame in a PON with automatic bandwidth adjustment according to the invention.

FIG. 12 is a diagram illustrating an exemplary downstream data frame 1200 corresponding to the exemplary upstream frame 500 for carrying data or information downstream from OLT 100 to the ONUs (ONU 1, 2, 3, 4, . . . and N) in a PON with automatic bandwidth adjustment according to the invention. The data being transmitted downstream from the OLT 100 to the ONUs include 1, 2, 3, . . . and N frames, one for each ONU in the PON. The time interval T for each of the frames is M×0.5 milliseconds (ms). Particularly shown in FIG. 12 is the downstream data frame 1200 for carrying data or information downstream form the OLT 100 to the ONUs in accordance with the invention.

The downstream frame 1200 comprises a plurality of fields, including a downstream preamble 1201, a downstream start frame delimiter (SFD) 1202, a downstream header 1203, a downstream ranging time stamp 1204, a churning control 1205, a downstream data packet channel 1209, and a downstream end frame delimiter (EFD) 1210. In addition, the downstream frame 1200 further comprises data frames N fields (1012, 2012, 3012, . . . and N012 for the ONUs 1, 2, 3, . . . and N, respectively.

The preamble 1201 contains 8 bytes (64 bits) of alternating 1s and 0s that alert each of the ONUs of the coming downstream frame 1200 and enables the synchronization of its timing. The SFD 1202, at 4 bytes, is used as a frame alignment signal to indicate the start of the downstream frame 1200.

The header 1203 is used for the system control of the PON that identifies the OLT 100 from which the data are being transmitted and specifies the unused bandwidth available for the PON. The header 1203 includes an OLT identifier (1 byte) that indicates the OLT number on the PON (i.e., OLT 100), another byte K1 used for the protection switch and automatic ranging functions for the PON, and an unused bandwidth (UBW) field of 2 bytes with automatic bandwidth adjustment.

The ranging time stamp 1204 is used to send the ranging time clock to each of the ONUs. The ONU 1, for example, copies the ranging time clock received from the OLT 100 and stores it into the ranging time stamp 1204 for the ONU 1. The OLT 100 calculates the timing difference (i.e., the round trip time) between the receiving time, the ranging time stamp received from the ONU 1, and the time of the ranging time stamp for adjusting the safety guard time between two consecutive data frames. The ranging time stamp 1204 can also be used for automatic bandwidth adjustment. The churning control 1205 (4 bytes) is used for the churning function of the PON and performing the new churning key request. Churning refers to the encryption of transmission channels in the art.

The downstream data packet channel 1209, a K×4-byte field where K is an integer, is used to transport the data packets with lower priority (such as computer data files or image pictures) to a particular ONU. The maximum payload length for each data packet in the channel 1209 in this particular embodiment is 2048 bytes. The data packet channel 1209 further comprises a plurality of fields including a data packet header (DPH), a priority (PRIO), a loopback (LPBK), a residential gateway number (RGN), a payload length, a payload, and a bit interleaved parity 32 (BIP-32). The DPH indicates the start of the data packet channel 1209. The PRIO defines the priority level of the data packets therein with respect to the data traffic flow, e.g., a value of 0 representing the lowest priority and 15 representing the highest. The LPBK defines the loopback function for the data packets in the channel 1209. The RGN identifies the residential gateway connected to a particular ONU. The payload length defines the total payload length for the data packets in the channel 1209. The payload length includes payload only, but not the bytes of the BIP-32. The payload contains the data packets of the channel 1209, with a maximum payload length of 2048 for each data packet in this particular embodiment. The EFD 1210, a 4-byte field, is used as a frame termination signal to indicate the end of the downstream frame 1200. The BIP-32 is used for monitoring the bit error ratio (BER) on the transmission link for transporting the data.

A particular embodiment of the method according to the invention comprises the steps of transmitting data between at least one of the ONUs and the OLT, detecting if there is any undelivered data in the data being transmitted, queuing the undelivered data in an undelivered data block (UDB) in an upstream frame 500 of the ONU, informing the OLT of the undelivered data using the undelivered data block (UDB), reading the UDB, adjusting bandwidth of the ONU according to the UDB, informing the ONU whether the PON is busy using an unused bandwidth block (UBW), and accepting a new transmission between the ONU and the OLT if the PON is busy or unavailable.

In addition, the downstream frame 1200 further comprises data frames 1012, 2012, 3012, . . . and N012 for the ONUs 1, 2, 3, . . . and N, respectively. Particularly shown in FIG. 12 is the field 1012 (with K×4 bytes where K is an integer) for the ONU 1 comprising four fields, namely the ONU header 1012A, leased channel 1012B, voice TDMA channel 1012C, and voice VOIP channel 1012D. The structure of the fields corresponding to the other ONUs, namely ONU 2, ONU 3, . . . and ONU N, is similar to that of the frame 1012 for ONU 1.

With reference to the field 1012 for ONU 1 in particular, the ONU header 1012A, a 16-byte field, identifies the specific ONU, i.e., ONU 1. The leased channel is M×4-byte field (M being an integer), which is used to transport data, such as TDM or IP data from the OLT 100, the PSTN or the IP network 200 to a particular ONU. The structure of the leased channel 1012B is generally the same as that of the leased channel 506 for the upstream frame 500 shown in FIGS. 5 and 6. The voice TDMA channel 1012C, an M×4 byte field where M is an integer, is used to transport local call voice data packets to a particular ONU. The structure of the voice TDMA channel 1012C is generally the same as that of the voice TDMA channel 507 for the upstream frame 500 shown in FIGS. 5, 7, 8 and 9. The voice VOIP channel 1012D, also an M×4-byte field, is used to transport long distance call data packets from the PSTN or the IP network 200 to a particular ONU. The structure of the voice VOIP channel 1012D is generally the same as that of the voice VOIP channel 508 for the upstream frame 500 shown in FIGS. 5 and 10.

FIG. 13 is a diagram illustrating an exemplary ONU header (e.g., the ONU header 1012A) for a downstream frame 1200 in a PON with automatic bandwidth adjustment according to the invention. The ONU header 1012A contains a plurality of fields, including a preamble, a start sub-frame delimiter (SSD) 1303, an ONU ID 1305, an automatic bandwidth adjustment beginning (ABAB) 1309, an automatic bandwidth adjustment terminating (ABAT) 1315, reserved fields K2 (1307), R (1311) and R (1313). The preamble 1301, a 4-byte field of alternating 1s and 0s (AA, AA, AA, AA in hexadecimal), alerts the ONU (e.g., ONU 1) of the coming ONU field of the downstream frame 1200 and enables the synchronization of its timing. The SSD 1303, a 4-byte field is used as a frame alignment signal to indicate the start of this subframe, namely the ONU field 1012 for ONU 1. The ONU ID 1305 is used to identify a particular ONU (out of the plurality of ONUs connected to the OLT 100), e.g., the ONU 1, in the PON. In the present embodiment, the ABAB 1309 (a 2-byte field) and the ABAT 1315 (a 2-byte field) are used for performing the automatic bandwidth adjustment in the PON according to the invention. The ABAB and ABAT for each of the ONUs are calculated according to the time difference values calculated for each grouping of two consecutive data frames in transmission from the ONUs to the OLT 100 in the PON. As these calculations are being performed, each of the ONUs transport the data with higher priority in the data frames.

An embodiment of the method according to the invention comprises the steps of calculating the unused bandwidth (UBW) and informing the ONUs of the UBW, sending a downstream frame to the ONUs, and determining if an upstream frame (for each of the ONUs) is received at the OLT. If it is determined that an upstream frame is received at the OLT 100, the UDB is recorded at the OLT 100, the automatic bandwidth adjustment beginning (ABAB) and an automatic bandwidth adjustment terminating (ABAT) are recalculated, and a new UBW for the downstream frame is calculated. If an upstream frame is not received at the OLT 100, a new UBW is calculated for the downstream frame at the OLT 100. The downstream frame with the recalculated ABAB and ABAT is sent to each of the ONUs.

At the ONUs, the UDB is calculated, and the upstream frames are transmitted to the OLT 100. At each of the ONUs, it is then determined whether a downstream frame is received. If the downstream frame is received, each of the ONUs records the recalculated ABAB and ABAT from the received downstream frame, updates the ABAB and ABAT, checks the UBW for deciding to accept (or not) a new transmission service request (such as a video on demand (VOID) request), and calculates a new UDB for each of the transmitted ONU frames. If it is determined that the downstream frame is not received, a new UDB is calculated for each of the transmitted upstream frames. The upstream frames are then transmitted to the OLT with the updated ABAB and ABAT.

Figure 14:
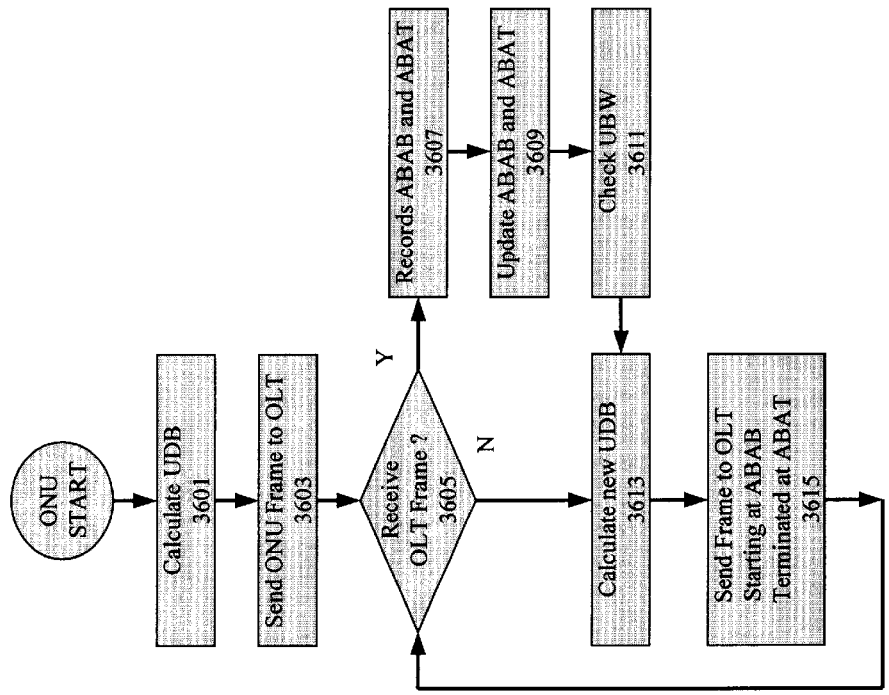
FIG. 14 is a flow diagram illustrating an exemplary embodiment of the method for the automatic bandwidth adjustment in a PON according to the invention.
Figure 14:
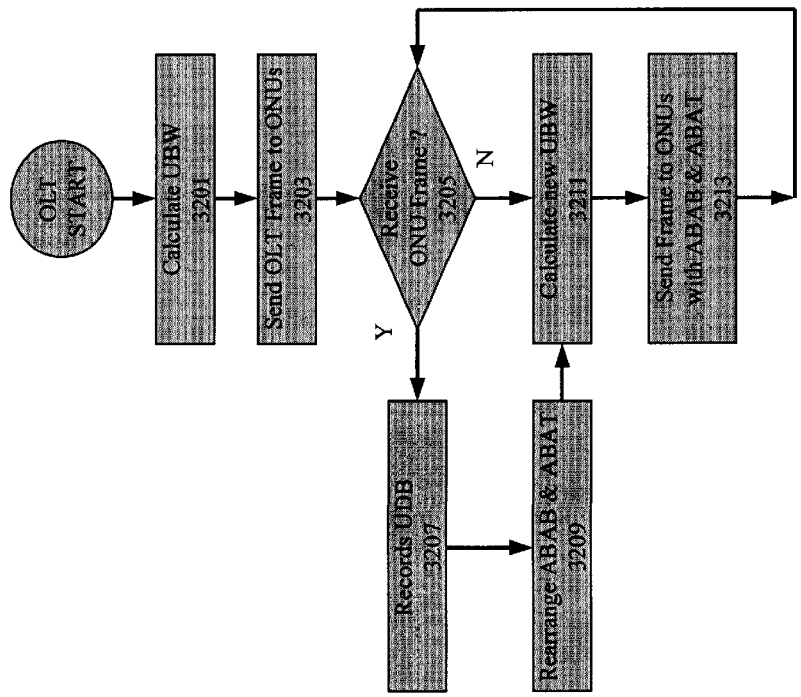

An exemplary embodiment of the method for the automatic bandwidth adjustment according to the invention is also illustrated in the flow diagram of FIG. 14. At the OLT 100, the unused bandwidth (UBW) is calculated in step 3201. In step 3203, a downstream frame 1200 according to the invention is sent to the ONUs from the OLT 100. In step 3205, it is determined whether an upstream frame 500 according to the invention is received. If it is received, then the control flow is directed to step 3207. If it is determined that the upstream frame 500 is not received, the control flow is directed to step 3211 instead.

In step 3207, the undelivered data block (UDB) is recorded. The ABAB and the ABAT are accordingly rearranged or recalculated in step 3209. A new UBW is calculated in step 3211. In step 3213, the downstream frame 1200 is sent to the ONUs with the newly calculated ABAB and ABAT, and the control flow is reverted to step 3205.

At the ONUs, the UDB is calculated in step 3601. In step 3603, an upstream frame 500 according to the invention is sent from one of the ONUs to the OLT 100. It is determined in step 3605 whether a downstream frame 1200 according to the invention is received. If it is received, the control flow is directed to step 3607. If it is determined in step 3605 that the downstream frame 1200 is not received, then the control flow is directed to step 3613.

In step 3607, the ABAB and the ABAT are recorded. The ABAB and the ABAT are updated in step 3609, and the UBW is checked in step 3611. A new UDB is accordingly calculated in step 3613. In step 3615, the upstream frame 500 is sent to the OLT 100 from the ONUs with the updated ABAB and ABAT, and the control flow is then reverted to step 3605.

With the automatic bandwidth adjustment method and system according to the invention, a PON, through its OLT, can advantageously control the bandwidth for each of the ONUs in the PON and accordingly optimize the overall bandwidth utilization therein.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

I claim:

1. An automatic bandwidth adjustment method in a passive optical network (PON) comprising an optical line terminal (OLT) connected to a plurality of optical network units (ONUs), the method comprising the steps of:
   transmitting data between at least one of the ONUs and the OLT;
   detecting if there is any undelivered data in the data being transmitted;
   queuing the undelivered data in an undelivered data block (UDB) in an upstream frame of the ONUs;
   informing the OLT of the undelivered data using the undelivered data block (UDB);
   reading the UDB;
   adjusting bandwidth of the ONU according to the UDB;
   informing the ONU whether the PON is unavailable using an unused bandwidth block (UBW); and
   rejecting a new transmission request between the ONU and the OLT if the PON is unavailable.

2. The method of claim 1 further comprising the steps of:
   calculating an unused bandwidth (UBW);
   informing the ONUs of the UBW;
   sending a downstream frame to the ONUs;
   determining if an upstream frame for each of the ONUs is received at the OLT;
   if it is determined that the upstream frame is received at the OLT, recording the UDB at the OLT, recalculating an automatic bandwidth adjustment beginning (ABAB) and an automatic bandwidth adjustment terminating (ABAT), and calculating a new UBW for the downstream frame;
   if it is determined that the upstream frame is not received at the OLT, calculating a new UBW for the downstream frame; and
   transmitting the downstream frame with the recalculated ABAB and ABAT to each of the ONUs.

3. The method of claim 2 further comprising the steps of:
   calculating the UDB at the ONUs;
   transmitting the upstream frames are transmitted to the OLT;
   determining whether the downstream frame is received at each of the ONUs;
   if it is determined that the downstream frame is received, recording the recalculated ABAB and ABAT from the received downstream frame, updating the ABAB and ABAT, and calculating a new UDB for each of the transmitted ONU frames;
   if it is determined that the downstream frame is not received, calculating a new UDB for each of the transmitted ONU frames; and
   transmitting the upstream frames to the OLT with the updated ABAB and ABAT.

4. The method of claim 3 further comprising the steps of:
   checking the UBW; and
   determining whether to accept a new transmission request between the OLT and one of the ONUs.

5. The method of claim 1 further comprising the steps of:
   sending an upstream preamble alerting the OLT of the upstream frame;
   sending an upstream start frame delimiter (SFD) indicating a start of the upstream frame;
   sending an upstream header indicating the ONU from which the upstream frame is transmitted;
   sending an upstream ranging time stamp responding to a ranging time clock sent from the OLT;
   sending a churning key performing churning for the PON; and
   sending an upstream end frame delimiter (EFD) indicating an end of the upstream frame.

6. The method of claim 1 further comprising the steps of:
   sending an upstream leased channel transporting data to the OLT;
   sending an upstream voice time division multiple access (TDMA) channel transporting local call voice data to the OLT;
   sending an upstream voice over Internet protocol (VOIP) channel transporting long distance call voice data to an IP network connected to the PON; and
   sending an upstream data packet channel transporting data packets to the IP network.

7. The method of claim 1 further comprising the steps of:
   sending a downstream preamble alerting the ONUs of the downstream frame;
   sending a downstream start frame delimiter (SFD) indicating a start of the downstream frame;

sending a downstream header indicating the OLT from which the downstream frame is transmitted;

sending a downstream ranging time stamp transmitting a ranging time clock to the ONUs;

sending a churning control performing a churning key request for the PON; and sending a downstream end frame delimiter (EFD) indicating an end of the downstream frame.

8. The method of claim 1 further comprising the steps of:

sending a downstream data packet channel transporting data packets to from an IP network connected to the PON to the ONUs;

sending a plurality of ONU fields from the OLT to the ONUs wherein the ONU fields correspond to each of the ONUs, the method further comprising the steps of:
 (a) sending in each of the ONU fields an ONU header indicating a start of the ONU field;
 (b) sending in each of the ONU fields a leased channel transporting data to the ONU corresponding to the ONU field;
 (c) sending in each of the ONU fields a voice time division multiple access (TDMA) channel transporting local call voice data to the ONU corresponding to the ONU field; and
 (d) sending in each of the ONU fields a voice over Internet protocol (VOIP) channel transporting long distance call voice data from the IP network to the ONU corresponding to the ONU field.

9. The method of claim 6 further comprising the steps of:

sending a leased channel header indicating a start of the upstream leased channel;

sending a payload length defining a total payload length of the upstream leased channel;

sending a payload for transporting time division multiplexing (TDM) data packets; and sending a bit interleaved parity for monitoring a bit error ratio (BER) for transmitting the data.

10. The method of claim 6 further comprising the steps of:

sending a voice TDMA header indicating a start of the upstream voice TDMA channel;

sending a residential gateway number identifying a residential gateway connected to one of the ONUs;

sending a payload length defining a total payload length of the voice TDMA channel;

sending at least one user port identification identifying a corresponding user port of one voice group;

sending a payload including voice data packets of the voice TDMA channel; and sending a bit interleaved parity for monitoring a bit error ratio (BER) for transmitting the data.

11. The method of claim 6 further comprising the steps of:

sending a voice VOIP header indicating a start of the upstream voice VOIP channel;

sending a priority defining a priority level for transmitting the data;

sending a residential gateway number identifying a residential gateway connected to one of the ONUs;

sending a payload length defining a total payload length of the voice VOIP channel;

sending a payload including IP packetized voice data packets of the voice VOIP channel; and sending a bit interleaved parity for monitoring a bit error ratio (BER) for transmitting the data.

12. The method of claim 6 further comprising the steps of:

sending a data packet header indicating a start of the upstream data packet channel;

sending a priority defining a priority level for transmitting the data;

sending a residential gateway number identifying a residential gateway connected to one of the ONUs;

sending a payload length defining a total payload length of the upstream data packet channel;

sending a payload including data packets of the upstream data packet channel; and sending a bit interleaved parity for monitoring a bit error ratio (BER) for transmitting the data.

13. The method of claim 8 further comprising the steps of:

sending a leased channel header indicating a start of the leased channel;

sending a priority defining a priority level and a payload type for transmitting the data;

sending a payload length defining a total payload length of the leased channel;

sending in the leased channel a payload for transporting time division multiplexing (TDM) data packets or IP data packets; and sending in the leased channel a bit interleaved parity for monitoring a bit error ratio (BER) for transmitting the data.

14. The method of claim 8 further comprising the steps of:

sending a voice TDMA header indicating a start of the voice TDMA channel;

sending a priority defining a priority level for transmitting the data;

sending a residential gateway number identifying a residential gateway connected to one of the ONUs;

sending a payload length defining a total payload length of the voice TDMA channel;

sending a payload including voice data packets of the voice TDMA channel; and sending a bit interleaved parity for monitoring a bit error ratio (BER) for transmitting the data.

15. The method of claim 8 further comprising the steps of:

sending a voice VOIP header indicating a start of the voice VOIP channel;

sending a priority defining a priority level for transmitting the data;

sending a residential gateway number identifying a residential gateway connected to one of the ONUs;

sending a payload length defining a total payload length of the voice VOIP channel;

sending a payload including IP packetized voice data packets of the voice VOIP channel; and sending a bit interleaved parity for monitoring a bit error ratio (BER) for transmitting the data.

16. The method of claim 8 further comprising the steps of:

sending a data packet header indicating a start of the downstream data packet channel;

sending a priority defining a priority level for transmitting the data;

sending a residential gateway number identifying a residential gateway connected to one of the ONUs;

sending a payload length defining a total payload length of the downstream data packet channel;

sending a payload including voice data packets of the downstream data packet channel; and sending a bit interleaved parity for monitoring a bit error ratio (BER) for transmitting the data.

17. An automatic bandwidth adjustment method in a passive optical network (PON) comprising an optical line terminal (OLT) connected to a plurality of optical network units (ONUs), the method comprising the steps of:

calculating an unused bandwidth (UBW);

informing the ONUs of the UBW;

sending a downstream frame to the ONUs;

determining if an upstream frame for each of the ONUs is received at the OLT;

if it is determined that the upstream frame is received at the OLT, recording the UDB at the OLT, recalculating an automatic bandwidth adjustment beginning (ABAB) and an automatic bandwidth adjustment terminating (ABAT), and calculating a new UBW for the downstream frame;

if it is determined that the upstream frame is not received at the OLT, calculating a new UBW for the downstream frame; and transmitting the downstream frame with the recalculated ABAB and ABAT to each of the ONUs.

18. The method of claim 17 further comprising the steps of:

calculating an undelivered data block (UDB) at the ONUs;

transmitting the upstream frame to the OLT;

determining whether the downstream frame is received at each of the ONUs;

if it is determined that the downstream frame is received, recording the recalculated ABAB and ABAT from the received downstream frame, updating the ABAB and ABAT, and calculating a new UDB for each of the transmitted ONU frames;

if it is determined that the downstream frame is not received, calculating a new UDB for each of the transmitted ONU frames; and transmitting the upstream frames to the OLT with the updated ABAB and ABAT.

19. The method of claim 18 further comprising the steps of:

checking the UBW; and determining whether to accept a new transmission request between the OLT and one of the ONUs.

20. The method of claim 19 wherein the new transmission request is a video on demand (VOD) transmission request.

* * * * *